United States Patent
Connolly

[11] Patent Number: 6,023,504
[45] Date of Patent: Feb. 8, 2000

[54] TELEPHONE SERVICES

[75] Inventor: David Connolly, Hong Kong, The Hong Kong Special Administrative Region of the People's Republic of China

[73] Assignee: Hong Kong Telecommunications Limited, The Hong Kong Special Administrative Region of the People's Republic of China

[21] Appl. No.: 08/963,216

[22] Filed: Nov. 3, 1997

[30]    Foreign Application Priority Data

Nov. 8, 1996  [GB]  United Kingdom .................... 9623343

[51] Int. Cl.[7] ........................................................ H04M 7/00
[52] U.S. Cl. ............................ 379/220; 379/219; 379/207
[58] Field of Search .................................... 379/220, 219, 379/228, 229, 230, 207, 260

[56]           References Cited

U.S. PATENT DOCUMENTS

| | | | |
|---|---|---|---|
| 5,333,185 | 7/1994 | Burke et al. | 379/207 X |
| 5,550,909 | 8/1996 | Chanda et al. | 379/220 |
| 5,661,790 | 8/1997 | Hsu | 379/220 X |

*Primary Examiner*—Creighton Smith
*Attorney, Agent, or Firm*—Jackson Walker L.L.P.

[57]            ABSTRACT

A UIFN toll free service is provided and controlled by control units 11 and 12 that communicate with each other using a separate data networks. The control units arrange the connection of calls on a telephone network. The calls are monitored and billing created for appropriate UIFN customers by the control units. In one embodiment, each call is established by a TNO control unit, as if the customer had initiated the toll free call. Such calls are then treated automatically, especially for billing, as normal IDD calls made by the TNO customer.

6 Claims, 1 Drawing Sheet

TELEPHONE SERVICES

BACKGROUND OF THE INVENTION

The invention relates to telephone services.

The invention relates more particularly to International toll free telephone services. International toll free services are provided between many countries today, and allows calls in an originating call network to a designated number in another country's terminating network, at no charge to the caller. The toll free customer connected to the terminating network then accepts the charge for the call, which is billed by a Terminating Network Operator (TNO).

Unlike a domestic toll free service, an International toll free service inevitably involves the co-operation of more than one network operator. Because of this, financial settlement arrangements between the operators are necessary; usually this will be between the originating and terminating network operators, but where calls are routed via one or more transit networks, more complicated settlement arrangements may be required. It is normal practice to bill and settle International toll free calls as if the calls had been made in the reverse direction, from the terminating network to the originating network. Thus, the toll free customer on the terminating network is billed for the call, and the TNO will settle with the Originating Network Operator (ONO) by transferring a duration-based payment, usually of the same value as for an International Direct Dial (IDD) call.

In a conventional International toll free service, special toll free numbers are issued by the ONO at the request of the TNO, and the ONO will also make arrangements to ensure that calls using toll free numbers do not cause charges to the caller which would apply for normal IDD calls. For a toll free customer in the terminating network to obtain coverage in many countries the TNO will need to apply to many other Originating Network Operators for allocation of their toll free numbers, and these are independently assigned by each operator without any correlation between countries. Thus callers using International toll free numbers need a directory of numbers in order to identify the correct toll free number to be used in a particular country of call origin. This has resulted in rather cumbersome arrangements which have deterred the development of International toll free services.

As a means of simplifying International toll free calls, a system of Universal International Freephone Numbers (UIFN) has been developed by network operators in conjunction with the International Telephone Union (ITU). A UIFN is a unique worldwide toll free number issued by the ITU in Geneva on application (usually) from a Terminating Network Operator. But the ITU issues a UIFN on behalf of the terminating network customer, not the TNO, so that the customer can transfer the number to an alternative terminating network if he chooses.

In contrast with conventional toll free service, the UIFN means that a single number can be used in any originating network to access the toll free customer. This simplifies the access process, and removes the need for each originating network operator to allocate network-specific toll free numbers which vary from country to country. In this way it is hoped that the simplified UIFN arrangements will encourage the use of International toll free service.

In the UIFN scheme, it is still necessary for the TNO, acting on behalf of its customer, to inform each ONO of the call routing requirements and other details for each UIFN. It is also necessary for each ONO to arrange for non-chargeable access from its network for UIFNs, including payphones and other systems such as Private Automatic Branch Exchanges (PABX).

For a typical UIFN call, the caller dials the UIFN in the originating network in the format +800 NNNN NNNN, where + is the IDD access code used by the ONO—usually prefix 00. The format of the UIFN will normally route the call to the respective international gateway exchange where the "Country Code" 800 for the UIFN will cause the call to be routed to a local database in order to identify the appropriate terminating network for that UIFN. The call will then be routed through the International toll free network to the terminating network, where the UIFN is again decoded to identify the actual TNO number required by the UIFN customer at that time. The customer may require the actual destination to be adapted by time of day or day of week, but this information is not passed to the ONO. In the terminating network, details of the location of the originating network together with the duration of the call will be logged in order to bill the UIFN customer and to make a settlement payment to the ONO.

In addition the ONO may also record details of the call for the purpose of auditing settlements made by the TNO.

In toll free operation, the call from the originating to the terminating network must be identified as toll free in order that the appropriate reversed settlement arrangements can be made. This requires that the signalling associated with the international circuits must contain a call darker to signify toll free; these markers may identify the originating network operator as well, to allow the TNO to compile accurate records for settlement and billing. In the case of International transit call routings, the toll free markers must allow for recognition by transit network operators so that their allocation of settlement payment can be identified. These arrangements usually require adaptation of conventional IDD signalling systems used on international routes and these complications have constrained the number of ONOs from offering an International toll free service.

Although UIFN operation greatly simplifies the issuing and use of numbers, it is still necessary for the TNO to inform all ONOs of new UIFNs, or of any changes for an existing UIFN. Thus UIFN operation is simpler from the user perspective, but still involves a significant amount of administrative effort in the registration process, together with adaptation of International signalling systems. Although UIFN operation is an improvement over the original International toll free service, there are still complexities associated with toll free signalling arrangements on international circuits (including transit arrangements) and in the administration of UIFN information from TNO to ONO.

It is an object of the invention to overcome or at least reduce these problems.

SUMMARY OF THE INVENTION

According to the invention there is provided a UIFN toll free telephone service for connecting a toll free caller to a Universal International Freephone Number customer via a main communication channel extending between an originating Network operator (ONO) and a Terminating Network Operator (TNO), including an ONO control unit and a TNO control unit associated respectively with the ONO and the TNO at each end of the main communication channel, in which each toll free call is established by communications between the control units on a separate communication channel, and arranged such that on receipt of a toll free call, the call is connected and routed under the control of the ONO and TNO control units.

The main communication channel may be provided by a Public Switched Telephone Network and the separate communication channel provided by a Data Network.

The TNO control unit may provide a MEET ME call and selectively route that call along the main channel to the ONO, in which subsequent communication between the caller and the customer is automatically treated for monitoring and billing purposes, as if the customer had initiated the call.

Signalling may be carried out between the ONO control unit and the TNO control unit to establish a selected category of service for the communications, and a choice of main communication channels other than the PSTN.

The control units may be arranged to be accessed from the separate communication channel connecting the control units for up-dating details of Universal International Freephone Numbers.

The TNO control units may be programmed to respond to a general or broadcast signal of a UIFN in the separate communication channel from any ONO control unit and to confirm to that ONO control unit that a broadcasted number is held by the responding TNO control unit

DETAILED DESCRIPTION OF THE PREFERRED EMBODIMENT

Figure 1:
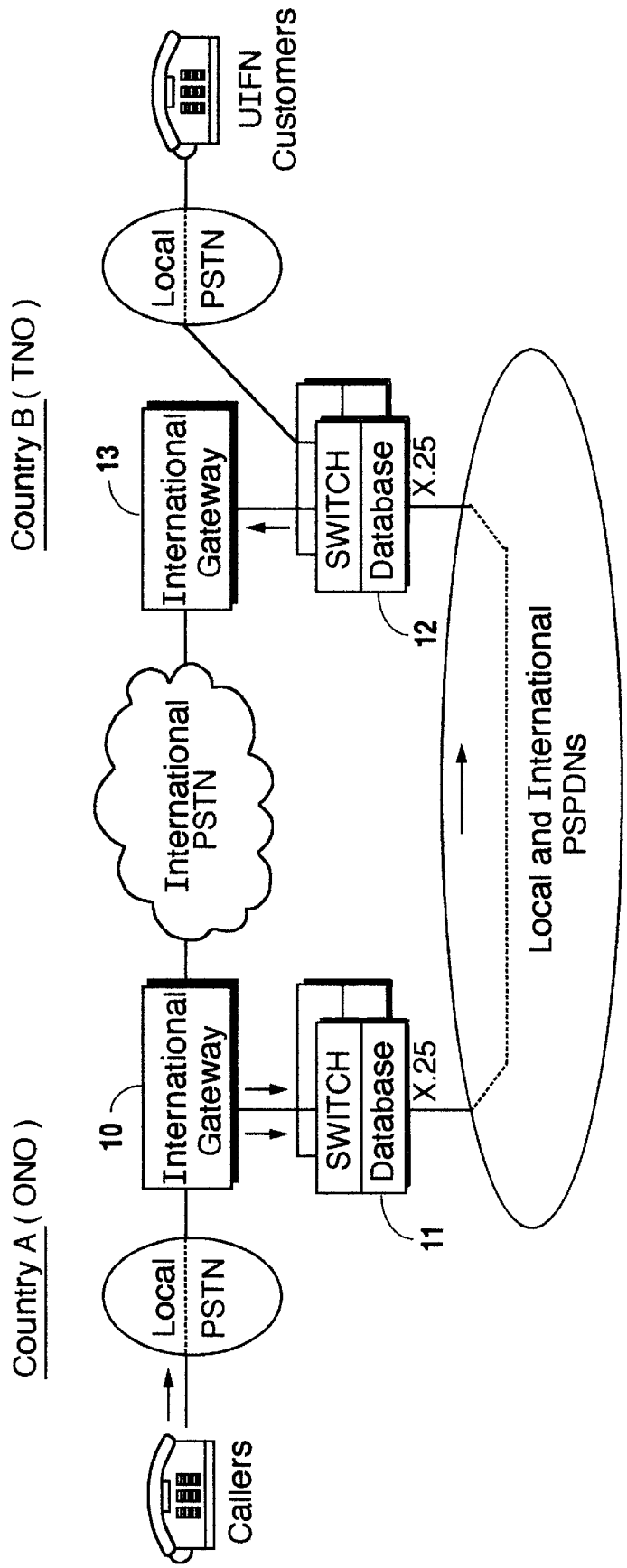

UIFN toll free services according to the invention will now be described by way of example with reference to an accompanying schematic diagram Referring to the diagram, calls are to be made between a toll free caller in country A via a local exchange (ONO) to a Universal International Freephone Number customer in country B of a Termination Network Operator (TNO). Conventionally, the calls would be made using a Public Switched Telephone Network (PSTN) communication channel and international gateways used to monitor the calls and keep special records for toll free payment settlements by the customer as explained earlier. In embodiments of the invention, communications between the international gateways are carried out via local and International Public Switch Packet Data Networks (PSPDN) using like switch and data storage control units at each end of the network, each unit being associated with the ONO or TNO.

In this way, the setting up of toll free calls as well as monitoring the calls, and extending facilities associated with such calls is significantly enhanced and all carried out making use of a suitable separate PSPDN rather than PSTNs.

In FIG. 1, a typical sequence of a toll free call is as follows:

1. The caller dials a UIFN eight digit number, NNNN NNNN prefixed by an + and 800 as explained above.

2. The call is routed via a local exchange (PSTN) to an international gateway 10 which sends the UIFN number to a switch/data storage control unit 11.

3. The unit 11 identifies the destination and routes the number through a selected x.25 packet or Intranet TCP/IP network (PSPDN), to a like control unit 12, providing the separate communication channel for supporting the toll free service.

4. The unit 12 translates the UIFN number to a PSTN number and determines the routing for communication back to the caller on the PSTN network. The unit sends a "MEET ME" call via an international gateway 13 and PSTN to the international gateway 10.

5. The gateway 13 relays the "MEET ME" call to the control unit 11.

6. The unit 12 also initiates a local call for the TNO to connect to the UIFN customer via a local PSTN.

7. When the UIFN customer answers, the control unit 12 monitors the call details, and creates records for settlement and the customer's bill.

An important aspect of the described service is that the call recording and billing procedure can be carried out as if the customer had initiated the call. That is to say, otherwise standard recording and billing programmes can be used for toll free calls. As far as such programmes are concerned, the customer can be regarded as having made an out-going call to any overseas toll free caller and settlements made as if the customer had made normal IDD calls.

In general, in the arrangement of the described service the control units 11 and 12, which may take many forms and include a large number of like units in an overall or multi-national data network, can exchange information at their convenience. In this respect, data bases of the control units are interconnected by the data networks (PSPDNs) and store all UIFN information. More importantly, the data bases can be up-dated with new and changed UIFN information as and when required. Further, if a UIFN is not immediately recognised as a valid number by any of the units when acting with an ONO, the number can be broadcast on the data network by that ONO. Any TNO that holds that UIFN on its associated data base can then respond and routing chosen by the ONO to send the call to the responding TNO.

In some embodiments of the service, the ONO or one of the ONOs may not hold any or many UIFNs and use a broadcasting signal every time the ONO wishes to determine the destination and routing of toll free calls that it receives.

A further facility that can be incorporated in the described service is the choosing of service categories, such as voice only, voice and 9.6 kbps fax, fax only using data transmission, internet access and full band width using 64 kbps. The choice of service can be requested by a marker, say, in the called number and the route, having a suitable quality specification, set up for the transmission. In this way, the higher quality communication channels can be selectively used as and when required, leading in some cases to lower costings for suitable toll free calls but ensuring that good quality channel are used when necessary.

Clearly with the facility of being able to choose categories, it will be necessary to choose a data network for some of the communications, wherein the so-called "main communications channel" becomes the data network.

The described services can be carried out and implemented and telephone and data network used by control units having circuitry and programmed computers which are per se already known in the industry and known by persons skilled in the art, therefore it is not necessary to describe the technology and equipment in detail. The described services, by using separate communication channels or connections between the switch and data storage control units, such as 11 and 12, located at each respective ends of main communication channels, enable control signals and information to pass separately between the units. It is also possible for the toll free call setting up communications and signals between the units to be transmitted over the telephone network while separately using the same network for the communications.

A UIFN toll free service according to the invention may be used to re-direct calls automatically. In that case, a TNO control unit holds any re-direction instructions and on receipt of the toll free call passes the re-direction instructions to the ONO. The ONO control unit arranges for connection of the call. The ONO control unit monitors the call and passes details of the call to the TNO for settlement by the TNO customer. In this way for example, a caller can be connected as a result of a re-direction order to a subscriber in his own region and appropriate charges made to a UIFN customer in another country.

What is claimed is:

1. A UIFN toll free telephone service for connecting a toll free caller to a Universal International Freephone Number customer via a main communication channel extending between an Originating Network Operator (ONO) and a Terminating Network Operator (TNO), including an ONO control unit and a TNO control unit associated respectively with the ONO and the TNO at each end of the main communication channel, in which each toll free call is established by communications between the control units on a separate communication channel, and arranged such that on receipt of a toll free call, the call is connected and routed under the control of the ONO and TNO control units.

2. A UIFN toll free telephone service according to claim 1, in which the main communication channel is provided by a Public Switched Telephone Network and the separate communication channel is provided by a Data Network.

3. A UIFN toll free telephone service according to claim 2, in which the TNO control unit provides a MEET ME call and selectively routes that call along the main channel to the ONO, and subsequent communication between the caller and the customer is automatically treated for monitoring and billing purposes, as if the customer had initiated the call.

4. A UIFN toll free telephone service according to claim 3, in which signalling is carried out between the ONO control unit and the TNO control unit to establish a selected category of service for the communications, and a choice of main communication channels other than the PSTN.

5. A UIFN toll free telephone service according to claim 4, in which the control units are arranged to be accessed from the separate communication channel connecting the control units for up-dating details of Universal International Freephone Numbers.

6. A UIFN toll free telephone service according to claim 5, in which the TNO control units are programmed to respond to a general or broadcast signal of a UIFN in the separate communication channel from any ONO control unit and to confirm to that ONO control unit that a broadcasted number is held by the responding TNO control unit.

* * * * *